(12) United States Patent
Gustafson et al.

(10) Patent No.: US 7,797,693 B1
(45) Date of Patent: Sep. 14, 2010

(54) NAND MOBILE DEVICES CAPABLE OF UPDATING FIRMWARE OR SOFTWARE IN A MANNER ANALOGOUS TO NOR MOBILE DEVICES

(75) Inventors: James P. Gustafson, San Jose, CA (US); Shao-Chun Chen, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 939 days.

(21) Appl. No.: 11/010,913

(22) Filed: Dec. 13, 2004

Related U.S. Application Data

(60) Provisional application No. 60/529,228, filed on Dec. 12, 2003.

(51) Int. Cl.
G06F 9/44 (2006.01)
G06F 13/00 (2006.01)
(52) U.S. Cl. .................... 717/168; 711/100; 711/103
(58) Field of Classification Search ......... 717/168–178; 711/100, 103
See application file for complete search history.

(56) References Cited

U.S. PATENT DOCUMENTS

| 5,261,055 A | 11/1993 | Moran et al. ............... 395/275 |
| 5,333,320 A * | 7/1994 | Seki ........................... 713/100 |
| 5,442,771 A | 8/1995 | Filepp et al. .............. 395/650 |
| 5,479,637 A | 12/1995 | Lisimaque et al. ......... 395/430 |
| 5,579,522 A | 11/1996 | Christeson et al. ........ 395/652 |
| 5,596,738 A | 1/1997 | Pope .......................... 395/430 |
| 5,598,534 A | 1/1997 | Haas ..................... 395/200.09 |
| 5,608,910 A | 3/1997 | Shimakura ................. 395/670 |
| 5,623,604 A | 4/1997 | Russell et al. ............ 395/200.1 |
| 5,666,293 A | 9/1997 | Metz et al. ............... 395/200.5 |
| 5,752,039 A | 5/1998 | Tanimura ................... 395/712 |
| 5,765,211 A * | 6/1998 | Luck .......................... 711/209 |
| 5,778,440 A | 7/1998 | Yiu et al. ................... 711/154 |
| 5,790,974 A | 8/1998 | Tognazzini ................. 701/204 |
| 5,878,256 A | 3/1999 | Bealkowski et al. ........ 395/652 |
| 5,960,445 A | 9/1999 | Tamori et al. .............. 707/203 |
| 6,009,497 A | 12/1999 | Wells et al. ................. 711/103 |
| 6,038,636 A | 3/2000 | Brown, III et al. .......... 711/103 |
| 6,064,814 A | 5/2000 | Capriles et al. ............ 395/701 |
| 6,073,206 A | 6/2000 | Piwonka et al. ............ 711/102 |
| 6,073,214 A | 6/2000 | Fawcett ...................... 711/133 |

(Continued)

FOREIGN PATENT DOCUMENTS

CA 2339923 3/2000

(Continued)

OTHER PUBLICATIONS

Park et al., "A Low-cost Memory Architecture with NAND XIP for Mobile Embedded Systems," 2003, ACM, p. 138-143.*

(Continued)

*Primary Examiner*—Wei Y Zhen
*Assistant Examiner*—Qing Chen

(57) ABSTRACT

A network with mobile devices supports update of firmware and/or software from one version to another version, the firmware or software being stored in non-volatile memory of the mobile handset, such as a NAND flash memory. In one embodiment, a firmware stored in the NAND non-volatile memory is updated by an update agent in a fault tolerant mode.

22 Claims, 8 Drawing Sheets

U.S. PATENT DOCUMENTS

| | | | |
|---|---|---|---|
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,260,156 B1* | 7/2001 | Garvin et al. | 714/8 |
| 6,279,153 B1 | 8/2001 | Bi et al. | 717/11 |
| 6,311,322 B1 | 10/2001 | Ikeda et al. | 717/1 |
| 6,438,585 B2 | 8/2002 | Mousseau et al. | 709/206 |
| 6,496,979 B1* | 12/2002 | Chen et al. | 717/178 |
| 6,536,038 B1* | 3/2003 | Ewertz et al. | 717/168 |
| 6,594,723 B1* | 7/2003 | Chapman et al. | 711/103 |
| 6,754,894 B1* | 6/2004 | Costello et al. | 717/169 |
| 6,789,158 B2* | 9/2004 | Takahashi | 711/103 |
| 6,791,877 B2* | 9/2004 | Miura et al. | 365/185.11 |
| 6,928,108 B2* | 8/2005 | Nelson et al. | 375/222 |
| 6,996,818 B2* | 2/2006 | Jacobi et al. | 717/170 |
| 7,039,796 B2* | 5/2006 | Ballard | 713/1 |
| 7,082,549 B2* | 7/2006 | Rao et al. | 714/6 |
| 7,111,292 B2* | 9/2006 | Bonnett et al. | 717/171 |
| 7,664,923 B2* | 2/2010 | Kim et al. | 711/162 |
| 7,698,698 B2* | 4/2010 | Skan | 717/168 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2004/0068721 A1* | 4/2004 | O'Neill et al. | 717/168 |
| 2004/0143828 A1* | 7/2004 | Liu et al. | 717/168 |
| 2004/0261072 A1* | 12/2004 | Herle | 717/171 |
| 2005/0102660 A1* | 5/2005 | Chen et al. | 717/168 |
| 2006/0258344 A1* | 11/2006 | Chen | 455/419 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Focus on OpenView A guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

NAND MOBILE DEVICES CAPABLE OF UPDATING FIRMWARE OR SOFTWARE IN A MANNER ANALOGOUS TO NOR MOBILE DEVICES

RELATED APPLICATIONS

This patent application makes reference to, claims priority to and claims benefit from U.S. Provisional Patent Application Ser. No. 60/529,228, entitled "MOBILE DEVICES CAPABLE OF UPDATING FIRMWARE OR SOFTWARE," filed on Dec. 12, 2003, the complete subject matter of which is hereby incorporated herein by reference, in its entirety.

In addition, this application makes reference to U.S. Provisional Patent Application Ser. No. 60/249,606, entitled "System and Method for Updating and Distributing Information", filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

Update of firmware or software is often one-way, with no means to rollback to a previous version. Different flash memory technologies have different read, write, and erase characteristics. It is therefore very difficult to update code in flash memories. Update software, such as agents, is often complicated. Some of the techniques are flash technology specific. Mobile devices are constrained devices and it is not currently possible to ensure rollback to previous versions of firmware or software. Update technologies therefore must be fool-proof and must not corrupt the devices being updated.

Mobile devices that contain NAND memory have special characteristics. Updating NAND memory devices using technology designed for previous NOR memory devices is not appropriate and is often inefficient. In addition, the behavior of NAND memory often is different from NOR memory, and code developed to manipulate NOR memory units will not work on NAND memory units.

Some mobile devices involve more than one processor, making the update of these devices very complex. In general, NAND memory in electronic device is less reliable than NOR. In fact, it is expected that some blocks will be bad when the device is manufactured. Thus, the potential for bad blocks cannot usually be ignored. This adds complexity to firmware update solutions for NAND memory.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be seen in an electronic device having a plurality of processors, each processor having its own address space. Such a device may comprise a plurality of NAND memory units communicatively coupled to and associated with the plurality of processors in one-to-one correspondence, and an update agent executable on one of the plurality of processors. The update agent may be capable of updating code in the NAND memory unit of the one of the plurality of processors. The device may also comprise a plurality of random access memory (RAM) units communicatively coupled to and associated with the plurality of processors in one-to-one correspondence. The update agent may be resident in the corresponding NAND memory unit associated with the one of the plurality of processors, and the one of the plurality of processors may be capable of transferring the update agent from the corresponding NAND memory unit into the corresponding RAM memory unit and of executing the update agent in the corresponding RAM memory unit to update the code. The device may also comprise a boot loader resident in the NAND memory unit corresponding to the one of the plurality of processors, and the boot loader may copy the update agent to the RAM memory unit corresponding to the one of the plurality of processors and may start execution of the update agent. In addition, the device may comprise an update package resident in the NAND memory unit corresponding to the one of the plurality of processors, and the update agent may employ the update package to update the code.

In a representative embodiment of the present invention, the electronic device may also comprise an operating system (OS) image resident in the NAND memory unit corresponding to the one of the plurality processors, and the update agent may employ the update package in updating the operating system (OS) image. Such a device may comprise a user data section in the NAND memory unit corresponding to the one of the plurality of processors, and the operating system (OS) image may mount in the NAND memory unit corresponding to the one of the plurality of processors when the operating system (OS) image is run. In addition, the update agent may refrain from updating the user data section while updating the operating system (OS) image. The electronic device may comprise kernel code resident in the NAND memory unit corresponding to an other of the plurality of processors, and the one of plurality of processors may instruct the other of the plurality of processors to boot and load the kernel code to the RAM memory unit of the other of the plurality of processors for execution. The device may comprise a plurality of relocatable modules resident in the NAND memory unit of the other of the plurality of processors, and the kernel code may be capable of loading and invoking at least one of the plurality of relocatable modules into the RAM memory unit of the other of the plurality of processors. The electronic device may comprise a local update agent resident in the NAND memory unit of the other of the plurality of processors. The local update agent may cause the kernel code to load the at least one of the plurality of relocatable modules into the RAM memory unit of the other of the plurality of processors, to update the at least one of the plurality of relocatable modules in the corresponding RAM memory unit, and to store the updated relocatable module back in the NAND memory unit of the other of the plurality of processors.

Additional aspects of the present invention may be found in an electronic device having a first processor and a second processor each having its own address space. Such a device may comprise a first NAND memory unit associated with and communicatively coupled to the first processor, and a second NAND memory unit associated with and communicatively coupled to the second processor. Each of the first processor and the second processor may have an associated update agent, and the first NAND memory unit and the second NAND memory unit may each comprise a boot loader, an operating system (OS) image, and a user data section. The update agent for the second processor may be resident in the NAND memory unit of the first processor, and the update agent for the second processor may be transferred from the NAND memory unit of the first processor to the second processor for execution. The update agent for the second processor may be resident in the NAND memory unit of the first processor, and the second processor may be associated with and communicatively coupled to a RAM memory unit. The update agent for the second processor may be transferred from the NAND memory unit of the first processor to the RAM memory unit for execution by the second processor.

In a representative embodiment of the present invention, the NAND memory units of the first processor and the second processor may comprise multiple update sections. The update sections may comprise an image section located proximate the start of the update section and a reservoir section located proximate the end of the update section, and a logical size of the update section may be less than a physical size of the update section. The update agent may track used and unused blocks in the update sections of the corresponding NAND memory units, in addition to the bad blocks in the update sections. The update agents may employ a scan phase to locate bad blocks in the associated update sections, and a first transform phase to back up at least a portion of the contents of the associated update sections before updating the at least a portion of the contents of the update sections. The update agents may also employ a transfer phase to copy the at least a portion of the contents of the update sections to an associated RAM memory unit, and a second transform phase to update the copied at least a portion of the contents of the update sections in the associated RAM memory unit. Such a device may also comprise a first update package resident in the NAND memory unit of the first processor for use by the update agent of the first processor, and a second update package resident in the NAND memory unit of the first processor for use by the update agent of the second processor. The electronic device may communicate the second update package from the NAND memory unit of the first processor to the NAND memory unit of the second processor for use by the update agent of the second processor.

A representative embodiment of the present invention may comprise an operating system (OS) image resident in the NAND memory unit of the first processor, and the update agent associated with the first processor may employ the first update package to update the operating system (OS) image. The first update package may be stored in a reserved space in the NAND memory unit of the first processor, in the reserved space using a basic NAND access mechanism (BNAM), and in the user data section in the NAND memory unit of the first processor. The update agents associated with the first processor and the second processor may track unused blocks in the corresponding NAND memory units so that a binary image can be adjusted at run time for bad blocks during an update process. The update agent associated with the first processor may track unused blocks in the corresponding NAND memory unit so that the operating system (OS) image can be updated at run time despite the discovery of bad blocks during the update. In addition, a representative embodiment of the present invention may comprise an update risk evaluator that evaluates the possibility of a successful update by at least one of the first update agent and the second update agent based upon the total number of known bad blocks in the corresponding NAND memory units being updated.

These and other advantages, aspects, and novel features of the present invention, as well as details of illustrated embodiments, thereof, will be more fully understood from the following description and drawings.

DETAILED DESCRIPTION OF THE INVENTION

The present invention relates generally to generating updates of firmware/software components in electronic devices such as, for example, mobile handsets using an update agent, and more specifically to the use of instruction sets in the generation of update packages that the update agents may process to produce updates for the firmware/software components. In a representative embodiment of the present invention, an update package may comprise a set of executable instructions for converting a first version of code to a second version of code. Code may be used herein to refer to software and/or firmware. Although the following discusses aspects of the invention in terms of a mobile handset, it should be clear that the following also applies to other mobile electronic devices such as, for example, personal digital assistants (PDAs), pagers, personal computers (PCs), and similar handheld electronic devices.

Figure 1:
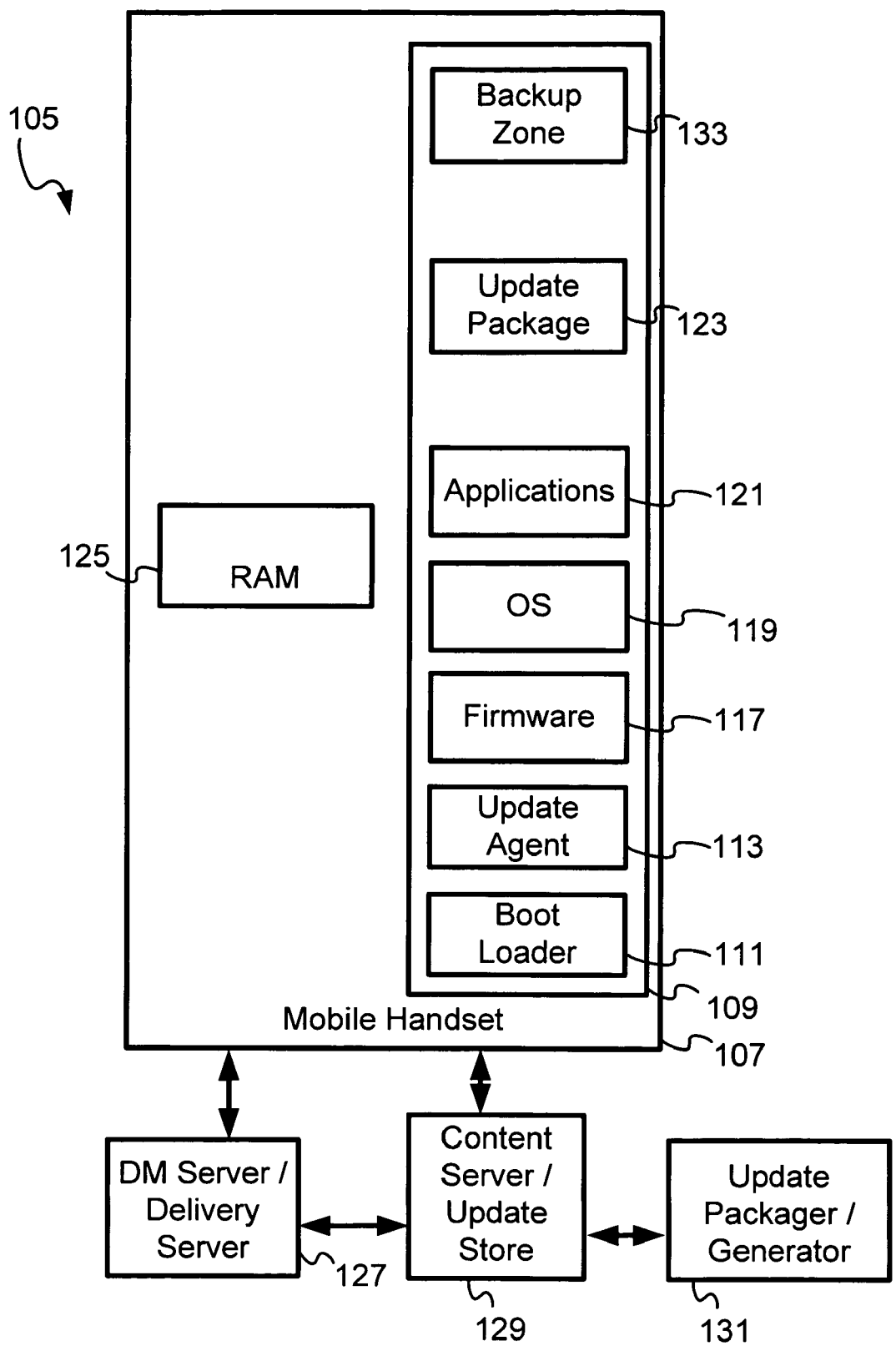
FIG. 1 is a perspective diagram of a network for the update of a mobile device such as, for example, the mobile handset wherein the mobile device may be updated using over-the-air (OTA) technology, in accordance with a representative embodiment of the present invention.

FIG. 1 is a perspective diagram of a network 105 for the update of a mobile device such as, for example, the mobile handset 107 wherein the mobile device may be updated using over-the-air (OTA) technology, in accordance with a representative embodiment of the present invention. As shown in FIG. 1, the network 105 of FIG. 1 comprises the mobile device 107, a device management (DM) server/delivery server 127, a content server/update store 129, and a update package generator 131. The mobile handset 107 comprises a non-volatile memory 109 such as, for example, a NAND flash memory that may be made up of one or more flash chips, and a RAM 125. In various representative embodiments in accordance with the present invention, the non-volatile memory 109 may comprise NAND and/or NOR flash memory. The mobile device 107 may also comprise a subscriber identity module (SIM)/smart card (not shown). The non-volatile memory 109 comprises a boot loader 111, an update agent 113, firmware 117, an operating system (OS) 119, applications 121, update package(s) 123, and a backup zone 133. In such an embodiment, the mobile devices 107 may be capable of updating firmware and/or software stored in the non-volatile memory 109.

In one representative embodiment of the present invention, the mobile device 107 may employ the backup zone 133 in non-volatile (flash) memory 109 to backup firmware 117, or other firmware/software components such as, for example, the operating system (OS) 119 and/or applications 121 that are to be updated. A mobile device such as, for example, the mobile handset 107 of FIG. 1 may be capable of automatically detecting that the firmware/software of the mobile handset 107 is inoperative or corrupted following an update operation of the firmware/software. The mobile device may then be capable of automatically initiating the incorporation of a backed up (or previous version) of firmware/software that has been stored in the backup zone 133 of the non-volatile memory 109 in the mobile handset 107.

In one representative embodiment of the present invention, the non-volatile memory 109 of a mobile device such as, for example, the mobile handset 107 may comprise a plurality of NAND memory flash chips. In another representative embodiment, the non-volatile memory 109 may comprise a combination of NOR and NAND flash memory. In yet another representative embodiment, the non-volatile memory 109 may comprise one or more NOR flash memory chips. In an embodiment of the present invention, the first few blocks of NAND memory may contain the boot loader 111 or a similar bootstrap software capable of loading other software modules into the RAM 125, where they are later executed.

In a representative embodiment of the present invention, a network such as, for example, the network 105 of FIG. 1 may support rollback of updated firmware and/or software in a mobile device such as, for example, the mobile handset 107, from an updated version to a previous version. In such a representative embodiment, the previous version may be stored in the non-volatile memory 109 of the mobile handset 107, such as in a NAND flash memory. In a representative embodiment of the present invention, the backup zone 133 of the non-volatile memory 109 may be employed, for example, to back up firmware 117, the OS 119, and/or the applications 121 that are to be updated by updating software such as, for example, the update agent 113. In a representative embodiment of the present invention, an automatic rollback may be supported. In another representative embodiment, a user-initiated or "hard" rollback may be supported.

In a representative embodiment in accordance with the present invention, the network 105 with mobile devices 107 may support the update of firmware and/or software from one version to another version. The firmware and/or software may be stored in the non-volatile memory 109 of the mobile handset 107 of FIG. 1 such as, for example, a NAND flash memory. In a representative embodiment of the present invention, a firmware 117 stored in the NAND non-volatile memory may be updated by an update agent 113 in a fault tolerant mode.

Figure 2:
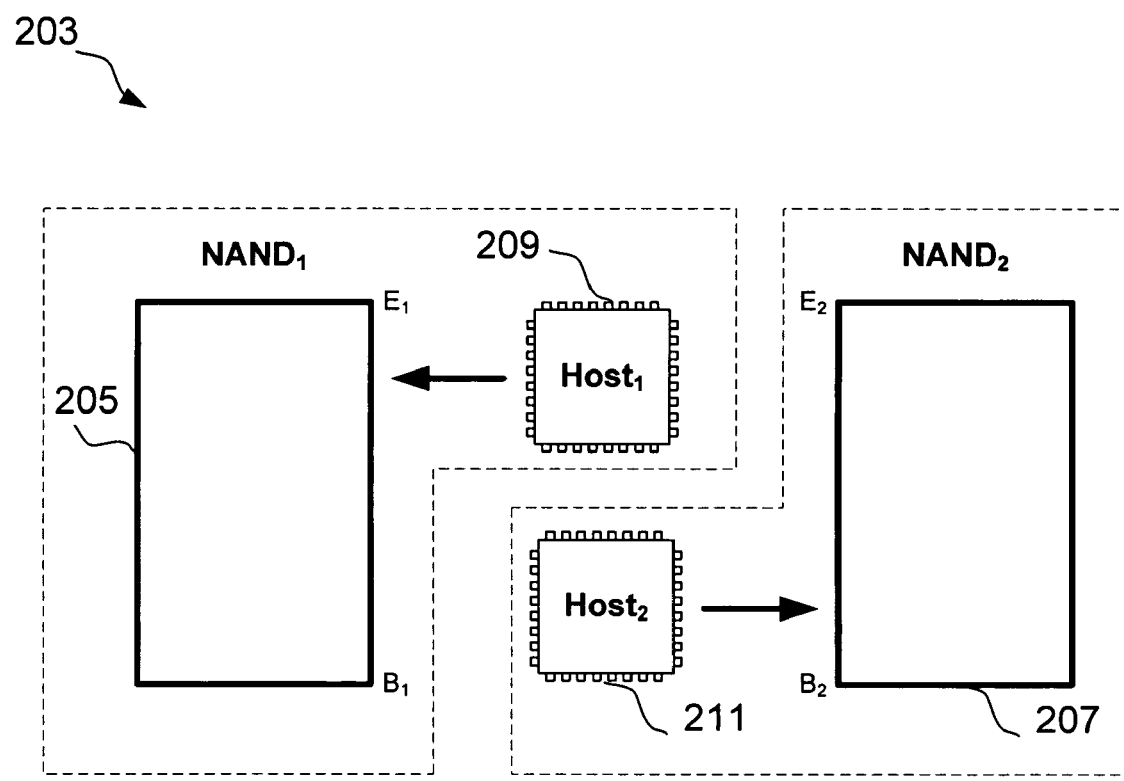
FIG. 2 illustrates an exemplary physical architecture of a mobile device such as, for example, the mobile handset of FIG. 1, in which the mobile device comprises multiple host systems each having associated NAND memory, respectively, in accordance with a representative embodiment of the present invention.

FIG. 2 illustrates an exemplary physical architecture 203 of a mobile device such as, for example, the mobile handset 107 of FIG. 1, in which the mobile device comprise multiple host systems 209, 211 each having associated NAND memory 205, 207, respectively, in accordance with a representative embodiment of the present invention. Each of the host systems 209, 211 and its associated NAND memory 205, 207 may operate within its own address space, and may comprise one or more processors such as, for example, and ARM® central processing unit (CPU) from ARM® ltd., and various digital signal processing (DSP) DEVICES. The architecture illustrated in FIG. 2 is for purposes of explanation only, and a different number of host systems and processors in each host system may be employed without departing from the spirit and scope of the present invention. In a representative embodiment of the present invention, each of the host systems 209, 211 may comprise an update agent that runs on general purpose processors such as, for example, and ARM® CPU, in the host systems 209, 211.

As shown in the illustration of FIG. 2, each of the NAND memories 205, 207 associated with the host systems 209, 211, respectively have base address B and an end address, E, that represent the range of the address space for each of the NAND memories 205, 207. In addition, the hosts systems may comprise RAM memory units (not shown), that may correspond, for example, to the RAM 125 of FIG. 1. Although represented symbolically as B and E in this discussion of FIG. 2, for the purposes of updating firmware/software in a mobile device such as, for example, the mobile handset 107 of FIG. 1, actual run-time addresses of firmware/software entities within the address spaces of the host system 209, 211 needs to be known.

Figure 3:
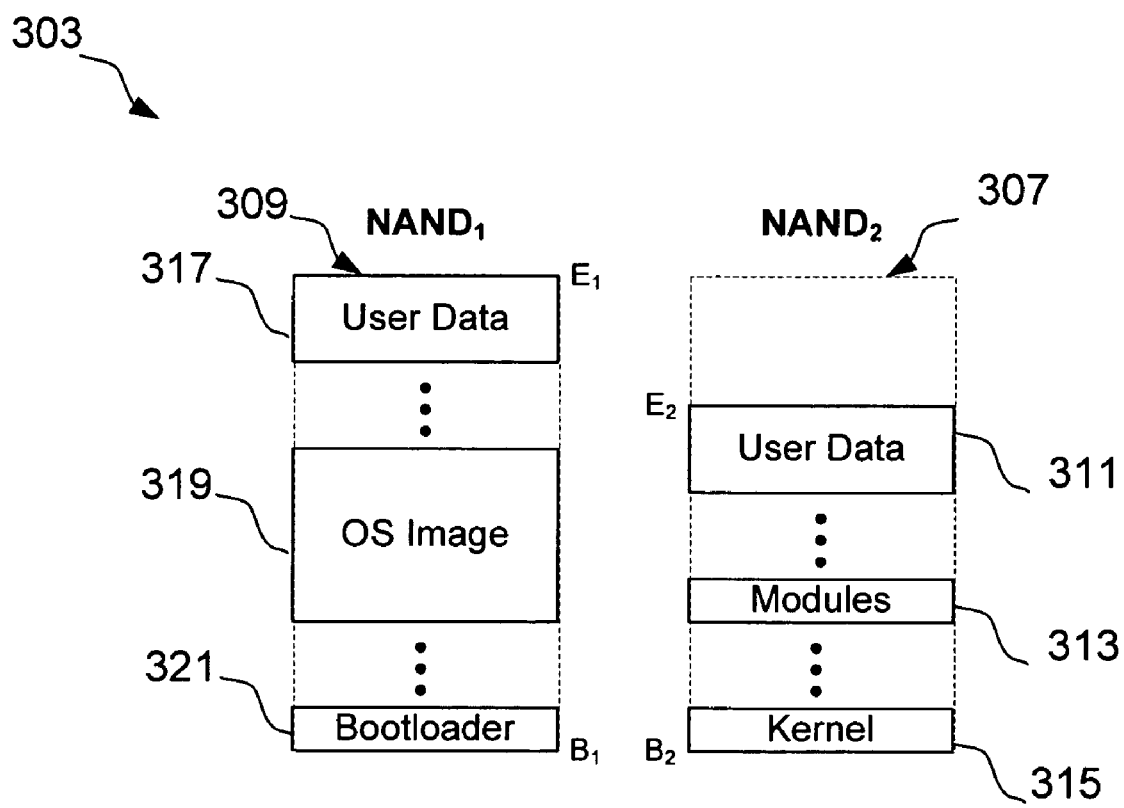
FIG. 3 shows the logical structure of the firmware/software contained within two exemplary NAND memory devices that may correspond, for example, to the NAND memories of FIG. 2, in accordance with a representative embodiment of the present invention.

FIG. 3 shows the logical structure 303 of the firmware/software contained within two exemplary NAND memory devices 307, 309 that may correspond, for example, to the NAND memories 205, 207 of FIG. 2, in accordance with a representative embodiment of the present invention. In the illustration of FIG. 3, the NAND memory 309 comprises a boot loader 321, an operating system (OS) image 319, and user data 317, while NAND memory 307 comprises a kernel 315, modules 313, and user data 311. The particular arrangement shown in FIG. 3 is for illustrative purposes only, and a representative embodiment of the present invention is not limited to the particular limitations of FIG. 3. The following discussion is applicable to other firmware/software and memory arrangements as well. In the illustration of FIG. 3, a beginning address B and an ending address E is shown for each of the address spaces of the NAND memories 307, 309, and represent the actual physical address constraints of the respective address spaces.

In a representative embodiment of the present invention, the boot loader 321 may comprise a small portion of the NAND memory 309 in this architecture. One of the purposes of the boot loader 321 may be to copy the OS Image 319 to a corresponding random access memory (RAM) of the associated host system such as, for example, the host systems 209, 211 of FIG. 2, and start execution of the OS. This may happen, for example, in the host system 209. The OS Image 319 may be the first OS running on the electronic device following power-up, and as such, may be the most important. For that reason, the first running firmware/software, such as the OS of OS Image 319, may be the first section of interest when updating the electronic device with new firmware or software.

The NAND memories 307, 309 of FIG. 3 also comprise user data 317, 311 When the OS Image 319 in a representative embodiment of the present invention runs, it may mount user data such as, for example, the user data section 317 in NAND memory 309. For firmware updates in NAND memory 309, the user data section 317 may not be considered for any type of update. The user data section 311 in NAND memory 307 may likewise not be considered for any type of update.

The NAND memories 307, 309 of FIG. 3 also comprise a kernel 315 that is resident in NAND memory 307. The kernel 315 may comprise the OS that runs on a host system such as, for example, the host system 211 of FIG. 2. The host system 209 may instruct the host system 211 on how to boot and load the kernel 315 into RAM for execution. The kernel 315 may also be considered for updating.

The NAND memories 307, 309 of FIG. 3 also comprise modules 313 in NAND memory 307. The modules 313 may be relocatable entities that the kernel 315 loads into RAM and uses. The modules 313 may also be considered for updating while updating firmware in NAND memory 307.

In a representative embodiment of the present invention, all sections of firmware/software to be updated may follow a Basic NAND Access Mechanism (BNAM). BNAM is a process by which data is stored in NAND memory, and may support the handling of bad memory blocks.

In a representative embodiment of the present invention, the BNAM may handle the reading and writing into NAND flash memory units. In conventional mobile devices, the writing of NAND memory has been performed in the factory at the time of manufacture. In a representative embodiment of the present invention, however, writing of NAND memory may be supported by an update agent such as, for example, the update agent 113 of FIG. 1. A BNAM may provide serial access to NAND memory such as, for example, the NAND memories 307, 309 of FIG. 3. A way in which data may be read randomly, and quantized to the block level, is for a scan of the BNAM section to be performed first, in order to map where the bad blocks are.

In a representative embodiment of the present invention, one purpose of the BNAM may be to write a contiguous binary image that may be an executable image, to NAND memory such as, for example, the NAND memories 307, 309 of FIG. 3. Such an executable image may later be copied to an associated RAM, in its entirety, for execution. The phrase "Basic NAND Access Mechanism" and its acronym, BNAM, are used herein to refer to this method.

Figure 4:
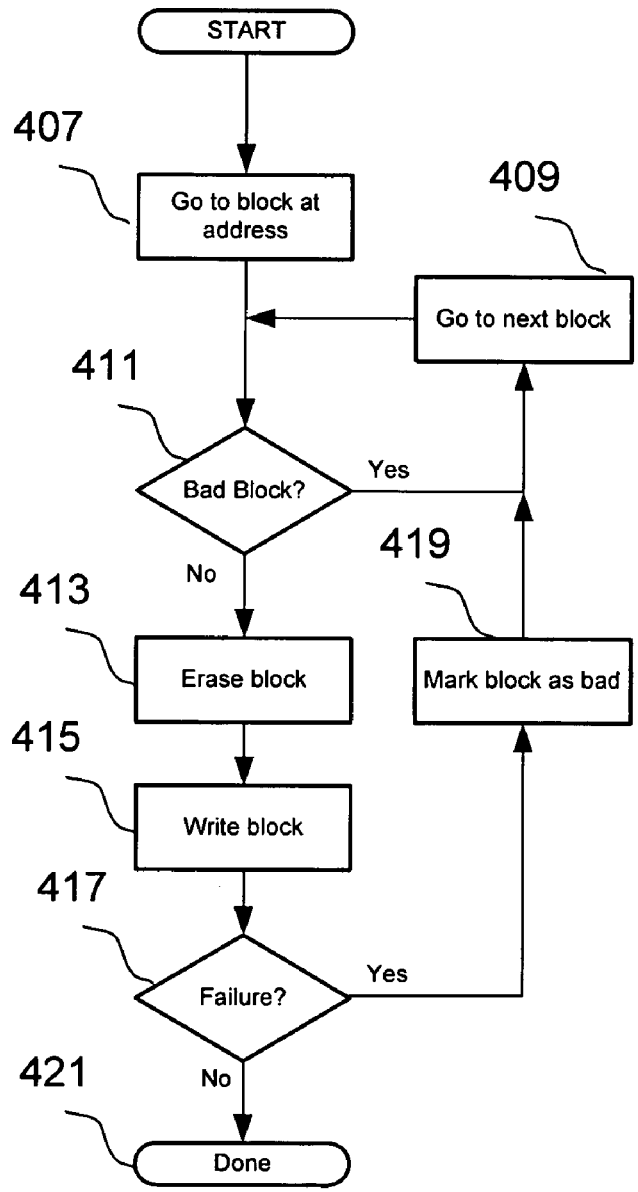
FIG. 4 is a flow chart of an exemplary process for writing to NAND flash memory such as the NAND memories of FIG. 3 as employed by a basic NAND access mechanism (BNAM), in accordance with a representative embodiment of the present invention.

FIG. 4 is a flow chart 403 of an exemplary process for writing to NAND flash memory such as the NAND memories 307, 309 of FIG. 3 as employed by a basic NAND access mechanism (BNAM), in accordance with a representative embodiment of the present invention. The process begins (block 407) when the BNAM manager selects a NAND memory block to be written. A determination is then made (block 411) whether the selected block of NAND memory is a bad block. If it determined that the selected block of NAND memory is a bad block (block 411), the selected block of NAND memory is skipped (block 409), and the BNAM write proceeds by determining whether the next block of NAND memory is a bad block (block 411). If the block of NAND memory block is determined to be valid (block 411), the NAND memory block is erased (block 413). The NAND memory block is then written with the new data (block 415). A determination is then made as to whether the write was successful (block 417). If the write of the NAND memory block failed (block 417), then it may be assumed that a new bad block is present in the NAND memory, and the NAND memory block will be marked as bad (block 419). If it is determined that the write of the NAND memory block was successful, the process of FIG. 4 ends (block 421).

A BNAM manager in a representative embodiment of the present invention be aware of how the data was written when reading NAND memory, and may detect when a block of NAND memory is bad and skip it, moving on to the next block of memory.

In a representative embodiment of the present invention, a variety of ways may be used to indicate bad blocks of NAND memory, and this aspect of the management of NAND memory is independent from the functionality of BNAM management described herein. In a representative embodiment of the present invention, the logic of an update agent that handles fault tolerant update of firmware or software in NAND memory units may be integrated with the BNAM management logic.

In a representative embodiment of the present invention, a update agents may be resident in NAND memory units such as, for example, the NAND memories 307, 309 of FIG. 3. Multiple update agents may be required in an architecture that comprises multiple NAND memory units. For example, there may be one NAND memory for each host system like the host systems 209, 211 of FIG. 2. As described above, a host system such as, for example, the host systems 290, 211 of FIG. 2 may comprise a general processor, and additional processors such as, for example, a digital signal processor (DSP).

Figure 5:
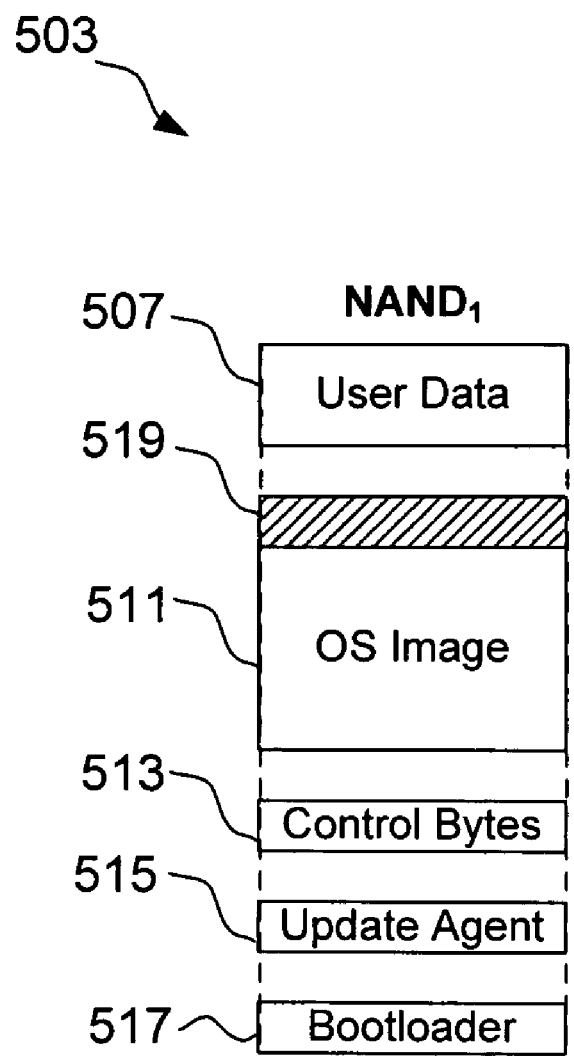
FIG. 5 is an exemplary memory layout for a NAND memory associated with a host system such as, for example the host systems of FIG. 2 of a mobile device having two host systems, that may correspond, for example, to the mobile handset of FIG. 1, in accordance with a representative embodiment of the present invention.

FIG. 5 is an exemplary memory layout 503 for a NAND memory associated with a host system such as, for example the host systems 209, 211 of FIG. 2 of a mobile device having two host systems, that may correspond, for example, to the mobile handset 107 of FIG. 1, in accordance with a representative embodiment of the present invention. The memory layout 503 shown in FIG. 5 comprises a boot loader 517, an update agent 155, control bytes 513, an operating system (OS) image 511 with reservoir 519, and user data 507. The boot loader 517, the update agent 515, the OS image 511, and user data may correspond, for example, to the boot loader 111, the update agent 113, and the OS 119 portions, respectively, of the non-volatile memory 109 of FIG. 1.

In a representative embodiment of the present invention, a boot loader such as, for example, the boot loader 517 in the memory layout 503 illustrated in FIG. 5 may be modified to accommodate booting the an update agent such as, for example, the update agent 515, instead of an operating system such as, for example, the OS Image 511, if a state variable specified in control bytes 513 indicates the update agent 515 is to be loaded. The control bytes 513 are not limited to the particular location shown, and may be stored almost anywhere in the memory layout 503. In one representative embodiment of the present invention, the control bytes 513 may reside in a separate 16K block of NAND memory. A variety of approaches may be used to implement the control bytes 513 without departing from the spirit and scope of the present invention.

In one representative embodiment of the present invention, the control bytes 513 may be located at the end of a Reserve Write Unit (RWU) of the memory layout 503 (not shown). In another embodiment of the present invention, a RWU may not be used. Instead, a representative embodiment of the present invention may employ control bytes stored within the last valid block in the reservoir 519 for the specific section to be updated.

In a representative embodiment of the present invention, the second host system of a two host mobile device such as, for example, the host system 211 of FIG. 2 may contain an update agent such as, for example, the update agent 515 of FIG. 5. The update agent code, however, may be stored in the NAND memory associated with a first host system such as, for example, the host system 209 of FIG. 2. In such a representative embodiment, the update agent code for second host system may be sent to the second host system from the first host system for execution.

A representative embodiment of the present invention may maintain a reservoir for each section in the NAND memory unit being updated such as, for example, the reservoir 519 of FIG. 5, for an OS image such as the OS Image 511. A reservoir may comprise a reserved set of NAND memory blocks associated with a particular section of memory, and may be part of the section itself. The larger the reservoir, the lower the probability that bad blocks may cause a fatal failure condition during an update.

In a representative embodiment of the present invention, a risk evaluator may evaluate the probability that the total number of bad NAND memory blocks encountered during an update, including both those found at the time of manufacture and those found at runtime, will permit the update process to complete.

In one representative embodiment of the present invention, the binary code in the various sections of NAND memory to be updated may be in an uncompressed form. In another representative embodiment of the present invention, the update agent may provide compression and decompression support and the various section of NAND memory to be updated may be in compressed form. In yet another representative embodiment, the BNAM may provide compression and decompression support and the sections of NAND memory to be updated may be in compressed form.

A representative embodiment of the present invention may support the update of linear contiguous binary image data stored in NAND memory units using the BNAM method or a variant thereof.

A representative embodiment of the present invention may provide support for multiple update sections. To support this, a representative embodiment of the present invention may comprise a generator for each update section and difference information may be generated for each update section separately. The resulting update information may all be packaged together in one update package as an update package set.

In a representative embodiment of the present invention employing a generator that supports updating multiple update sections, a special tool may be employed that combines multiple update packages into a "set." The update package set (UPS) may comprise a header along with the contents of all the binary update packages. The header may provide information on individual update packages in the set, in a form that an update agent such as, for example, the update agent 515 of FIG. 5 in a mobile device such as, for example, the mobile handset 107 of FIG. 1 is able to parse and understand.

Another representative embodiment of the present invention may create individual update packages instead of a UPS, and the individual update packages may be downloaded and stored in a mobile device for updating. In addition, each downloaded update package may be placed in a designated and/or reserved (special) place in memory that is able to be accessed individually.

In a representative embodiment of the present invention, the update package for the OS Image in the NAND memory of the first host system in a mobile device comprising multiple host systems such as, for example, the NAND memory 205 of host system 209 may be accessed directly, when it becomes time to run the update agent to start an update process. An update package for updating the NAND memory of the second host system such as, for example, the host system 211, may be sent to the second host system by the first host system.

In a representative embodiment of the present invention, an update package set may be stored in a reserved space in NAND memory such as, for example, the NAND memory 205. In one representative embodiment, the update package set may be stored in a user data section such as, for example, the user data section 317 of FIG. 3. The UPS may be placed in a reserved space using the BNAM method described above.

In order to present how the update of NAND memory works in a representative embodiment of the present invention, it is useful to review how updates may be handled with mobile devices having NOR flash memory. NOR flash memory devices offer linear access for byte addressing. Each byte may be randomly read directly. Because of the ability to support random access, NOR flash memory devices may directly run executable code. In addition, NOR flash memory may be generally relied upon. Bad memory blocks are normally not present after manufacturing, and it is quite rare for runtime bad memory blocks to appear. In fact, the appearance of band memory blocks in a NOR memory is a rare enough occurrence that the update process may not make provision for them. If a bad memory block does appear in a NOR flash memory, it is considered to be a hardware failure.

In a representative embodiment of the present invention, a mobile device such as, for example, the mobile handset 107 of FIG. 1 may comprise both NOR and NAND flash memory units.

Figure 6A:
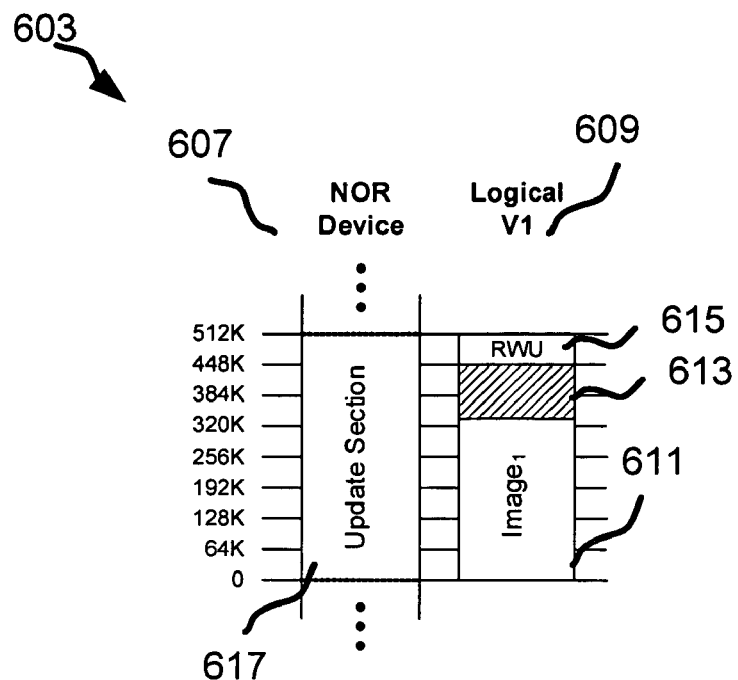
FIG. 6A shows an exemplary memory image layout for NOR flash memory units.

FIG. 6A shows an exemplary memory image layout for NOR flash memory units. A compiled binary image may be written directly to NOR flash memory. In the FIG. 6A, a contiguous section of memory 617 is chosen to be updateable. This section of memory 617 may be referred to as an update section. An update section represents an abstract part of a NOR flash memory device that is intended for updating. The update section may comprise the entire NOR flash memory device, or any part thereof.

In the example of FIG. 6A, the Update Section 617 starts at address 0 and ends at address 512K. These section address constraints are logical and correspond to physical addresses for NOR flash memory, there being exactly 512K in size between the extents.

FIG. 6A shows how a compiled image 611 may be placed into the NOR device 607. The compiled image shown in FIG. 6A, memory image Image1 611, is just over 320K bytes in size. Additionally, a reserve write unit (RWU) 615 may be positioned in the last 64 kB of the update section in logical view 609. The RWU 615 may serve as a backup mechanism during the update process. The space between the end of the memory image Image1 611 and the RWU 615 may be referred to as "empty" space. In other words, the space between the end of memory image Image1 611 and the start of RWU 615 may not be used. It may be assumed that the empty space is comprised of all logical '1' bits.

Note that FIG. 6A shows the Logical V1 909, holding the memory image Image1 611. To convert the logical addressing to physical addressing, the absolute address of the start of the update section must be known. If the start address is 0x0, then the logical address values may be equal to the physical address values. Regardless of where in the memory map the update section 617 is located, it may always be 512K bytes in length. For this discussion of NOR flash memory, it may be assumed that the physical address of 0x0 corresponds to the start address of the update section 617 at location 0. Thus no memory space exists before this address.

A generator capable of generating update packages for a mobile device such as, for example, mobile handset 107 of FIG. 1 may be configured specifically for the memory arrangement of the mobile device. A generator may process a first code version and a second code version and generate difference information that may be encoded as a set of executable instructions for converting the first code version to the second code version. An example of a generator may be found in U.S. Provisional Patent Application Ser. No. 60/249,606, entitled "System and Method for Updating and Distributing Information", filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety. For the layout presented in FIG. 6A, the following generator configuration may be of significance. A NOR flash memory device may be defined to exist from address 0x0 to address 0x80000 (512K)—these addresses may be referred to as the device constraints. Write units may correspond to the physical block sizes of a NOR flash memory device. Therefore, a value of 64K may be chosen. The horizontal lines in FIG. 6A show each 64K boundary. As can be seen in FIG. 6A, the memory image Image1 611 fits in 6 write units. The RWU 615 may be defined to start at address 448K and may be 64K bytes in size. For the example discussed here, two versions of the compiled image may be supplied to the generator, as described above.

Figure 6B:
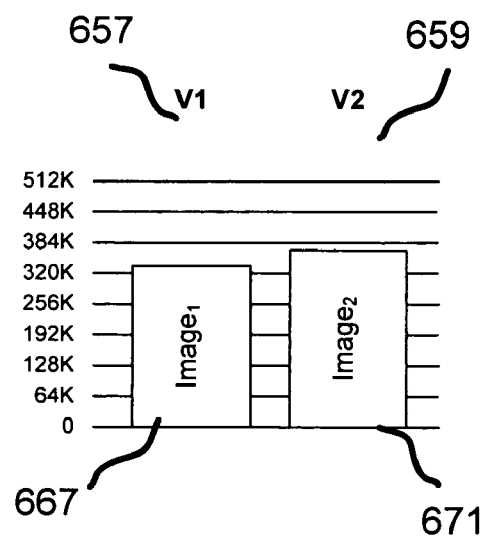
FIG. 6B shows the relative sizes of two memory images that may be employed by a generator in creating an update package that a mobile device having NOR flash memory devices may employ to update the mobile device.

FIG. 6B shows the relative sizes of two memory images that may be employed by a generator in creating an update package that a mobile device having NOR flash memory devices may employ to update the mobile device. As illustrated in FIG. 6B, a memory image Image1 667 is approximately 336K in length, and a memory image Image2 671 is approximately 368K in length. A generator may create an update package (e.g., a "delta" file) based on the binary information contained in the two memory images 667, 671. Because the two images 667, 671 may contain execute in place code (XIP), and because the architecture keeps the same address mapping at all times, the physical and virtual addresses for the memory images 667, 671 remain the same. That is, address 0x0 is address 0x0 when execution is underway.

To update from Image1 667 to Image2 671 in the electronic device, an update process may run through two phases of execution. During the two phases, NOR flash memory may be read directly, in a byte-by-byte manner. Writing and erasing of the NOR flash memory, which may be done through a wrapper function, may be performed on a block basis.

An update process may comprise a transform phase referred to as a transform 1 phase that may be mainly geared towards backing up data before updating of memory. In order to update anything in a fault tolerance manner, information that is to be modified may be backed up first, if it contains information used in future modifications. A reserve write unit such as RWU 615 may enable this phase. In an update process, a write unit may be placed into the RWU, then another Write Unit may be placed into the previous write unit, and so on. During this transform 1 phase, preprocessing may also be performed on the data to be updated before it is written to the destination write unit. Preprocessing may permit a generator to achieve smaller update package sizes.

The update process may also comprise a second transform phase referred to as a transform 2 phase that transforms preprocessed data into a final form such as, for example, a memory image Image2. As each Image2 write unit is created, it is written to NOR flash memory and verified before moving on to process the next write unit. Each write unit may be updated in an optimized order prescribed by the generator until all of the write units are written. At this point, the update may be complete.

During the transform 2 phase of the update process described above, information may be repeatedly referenced from the existing NOR flash memory, from elsewhere in the update section. This is easily supported because of the linear nature of the NOR flash memory.

Fault tolerance may be an aspect of NOR flash memory updates. An example of a fault tolerant update processor may be found in U.S. Provisional Patent Application Ser. No. 60/249,606, entitled "System and Method for Updating and Distributing Information", filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety. If state information is maintained an update agent such as, for example, the update agent 113 shown in FIG. 1 may know during execution which phase it is currently in.

If an interruption of the update process occurs while the update process is in the transform 1 phase, the write units (i.e., the memory to be updated) may be examined to determine where the transform 1 phase was interrupted. Once this location is determined, the transform 1 phase may continue.

If an interrupt of the update process occurs while the update process is in the transform 2 phase, the write units may again be examined to determine where the transform 2 phase was interrupted. Once this location is determined, the transform 2 phase may continue.

Having briefly considered the update of NOR memory, it is now appropriate to review mobile device update processes that employ NAND flash memory units. An important difference in NOR and NAND flash memory operation is that NAND flash memory is not accessed directly. NAND flash memory is normally read a page at a time, where a page is typically 512 bytes in length. For this reason, and because reading NAND flash memory typically takes longer than reading NOR flash memory, direct program execution from NAND flash memory is not commonly performed. In some systems, special logic may be used to directly execute from NAND flash memory, although it is usually reserved for a small section at the beginning of the NAND flash memory, specifically for booting.

A representative embodiment of the present invention may not involve direct execution from NAND flash memory. As discussed above, NAND flash memory may be less reliable than NOR flash memory. Because it is expected that some NAND flash memory blocks may be bad when the memory device is manufactured, a representative embodiment of the present invention is adapted to accommodate the occurrence of bad blocks in NAND flash memory.

As is the case with NOR flash memory, a compiled binary image such as, for example, Image1 611 of FIG. 6B may be written to NAND flash memory such as, for example, the NAND flash memories 205, 207 associated with the host systems 209, 211, respectively, of FIG. 2. As in the case of NOR flash memory, the writing of binary image information may not be direct.

Figure 7:
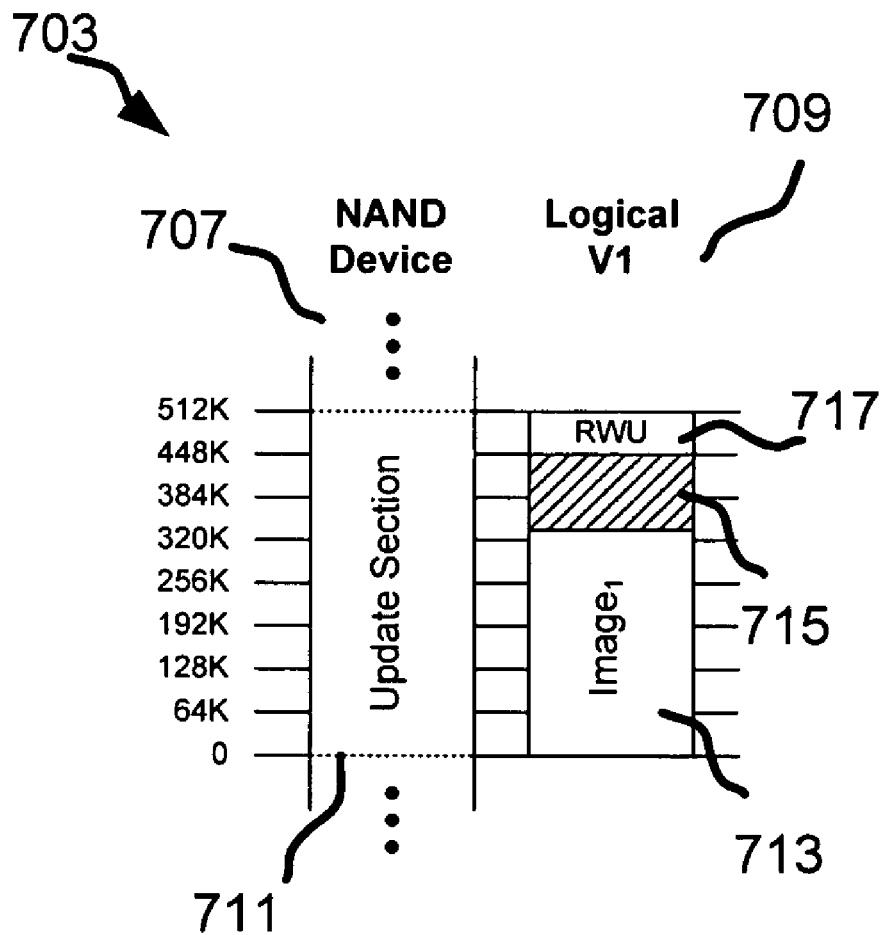
FIG. 7 shows an exemplary memory image that may exist, for example, in a NAND flash memory in accordance with a representative embodiment of the present invention.

FIG. 7 shows an exemplary memory image 703 that may exist, for example, in a NAND flash memory in accordance with a representative embodiment of the present invention. The illustration of FIG. 7 shows a physical NAND memory layout 707 and a logical view 709. The NAND memory layout 707 comprises an update section 711. The logical view 709 comprises a binary image Image1 713, a space 715 that may be unused, and a RWU 717.

In the illustration of FIG. 7, the binary image Image1 713 is shown at the beginning of the 512K byte update section 711. If bad memory blocks are ignored when writing data to NAND flash memory, all 320K bytes of binary image Image1 713 may be written in a linear fashion. That is, the byte of Image1 located at address 0 may also be located at address 0 in the update section 711.

In accordance with a representative embodiment of the present invention, when NAND flash memory is used, the first few blocks of it may be employed for some form of booting mechanism. Therefore, the beginning or initial address of the update section such as, for example, the update section 711 of FIG. 11 may not align to the NAND flash memory physical address of 0x0. Likewise, because a binary image such as, for example, the binary image Image1 713 may not be executed directly from NAND flash memory, the physical addresses of the contents of the update section 711 may not be the actual execution addresses. Only after the binary image Image1 713 stored in the update section 711 is transferred to RAM will the physical addresses of the binary image in RAM be valid execution addresses. The values shown in FIG. 7 may correspond to offsets within the update section 711.

In a representative embodiment of the present invention, the generator configuration settings for updating NAND flash memory may correspond in some respects to those discussed above for NOR flash memory. In terms of device constraints, a memory device may be defined to exist from physical address 0x0 to physical address 0x80000 (i.e, 512K bytes in length). When updating, however, the binary image may not be located at that starting address.

NAND flash memory uses blocks in a different way than NOR flash memory. Most NAND flash memory devices have 16K byte blocks. Erasure of memory contents may occur on a per block basis, while writes to memory may occur on pages which are normally 512 bytes in length (plus spare bytes). In a representative embodiment of the present invention, 64K byte write units may be used to be consistent with the NOR flash memory update methods referenced above, in the interest of conserving memory. Write units that are larger or smaller that 64 k bytes in size may be employed, however, without departing from the spirit or scope of the present invention.

In a representative embodiment of the present invention, if a 64K byte write unit is selected, it may actually be comprised of four 16K byte NAND flash memory blocks.

As shown in FIG. 7, the binary image Image1 713 occupies six write units with the exemplary values described above. The RWU 717 may be defined to begin at address 448K and may be 64K bytes in length, which may be the write unit size. In this scenario, the RWU 717 may be utilized as in the NOR flash memory example, above.

As described above, two code versions of a compiled binary image may be supplied to a generator in accordance with a representative embodiment of the present invention, to generate an update package with difference information. The illustration of FIG. 6B shows one example of relative sizes of binary images. In the illustration of FIG. 6B, binary image Image1 667 is approximately 336K bytes in length, while binary image Image2 671 is approximately 368K bytes in length. In a representative embodiment in accordance with the present invention, a generator may create an update package (e.g., a "delta" file) based on the binary information contained in the two binary images.

In accordance with a representative embodiment of the present invention, binary images to be used in updating a mobile device employing NAND flash memory may be treated in substantially the same way as for mobile devices employing NOR flash memory. As mentioned above, physical addresses correspond to those in the memory device, which in this example exist in a NAND flash memory device. During the update process, the physical addresses of the contents of the NAND flash memory may be converted or mapped to a different address. Because the binary images stored in the NAND flash memory, during a normal run, may be copied in their entirety to RAM, they may have a different virtual address. This may be properly configured.

For example, during an update process to update from a binary image Image1 to a binary image Image2 in the mobile device, the update process may run through a couple phases of execution. In the first phase, that may be called the transform 1 phase, the update may be mainly geared towards backing up data before updating. To enable a fault tolerant update, information to be modified may be backed up if it is also to be used for future modifications.

A representative embodiment of the present invention may employ a reserve write unit (RWU) to enable this phase of the update process. A selected write unit may be placed into a reserve write unit location such as, for example, the RWU 717 of FIG. 7. Then, another write unit may be placed into the memory location of the previous write unit, and so on. In a representative embodiment of the present invention, preprocessing may also be performed during this phase of the update process, on the data being updated, before it is written to the destination write unit. A representative embodiment of the present invention may use preprocessing during the generation portion of the update process to enable the generator to create smaller update package sizes.

In a representative embodiment of the present invention, a transform 1 phase of an update process may copy write units from the NAND flash memory for processing into RAM of the associated host system or processor. This may be done with a standard memory copy command. In a representative embodiment of the present invention, the memory copy utility function may be "overloaded" to provide a special interface to the NAND flash when copying from the address range of that device.

In a representative embodiment of the present invention, the writing of each write unit to the NAND flash memory may be accomplished by adapting flash memory erase and flash memory write wrapper functions so that they operate on four memory blocks at a time at the appropriate location for writing.

In a representative embodiment of the present invention, a different transform phase that may be called a transform 2 phase of the update process may copy the entire valid image from an update section such as, for example, the update section 711 of FIG. 7, to RAM before running the transform 2 phase of the update process. This may be done in an update process control function (UPCF) when the transform 1 phase completes. The binary image may be copied to an image buffer, which is of the size of the entire update section 711, including the RWU 717.

In a representative embodiment of the present invention, the entire update may then be performed on the original binary image in RAM. Once the update process is complete, the binary image may be written to flash using the flash wrapper functions, from the UPCF.

In a representative embodiment of the present invention, flash memory may not be referenced during the transform once the binary image is copied to RAM. The transforms, such as the transform 2 phase, may reference the original binary image for source material. A generator may be configured to reference this material from memory addresses in the NAND flash memory address range. A wrapper function named ua_device_addressTranslator( ) may be implemented such that the wrapper function redirects memory addresses to the image buffer in RAM that is being updated. This redirection may depend on the exact location of the buffer, since it may change when using dynamic memory allocation.

In a representative embodiment of the present invention, flash memory may not be written during the transform 2 phase. Once the transform 2 phase is applied against the entire binary image buffer, the entire updated binary image may be written to the NAND flash memory. Writing may be done on a per write unit basis so that validity may be checked before proceeding.

In a representative embodiment of the present invention, fault tolerance may be implemented in a straightforward fashion, and may operate in a very similar manner to a NOR flash memory version. An update agent such as, for example, the update agent 113 of FIG. 1 may know during execution which phase the update process is in, based upon state information that is maintained. If the update agent 113 is interrupted during the transform 1 phase, the write units may be examined to determine where in the transform 1 phase the update process was interrupted Thus it is possible for the update agent 113 to determine which transform phase was being executed when a failure or interruption was encountered during a previous attempt to update the device using the update agent 113.

If the update process of a representative embodiment of the present invention is in the transform 2 phase, again the write units may be examined to determine where the transform 2 phase of the update process was interrupted. If it is determined that there are still write units left to update, initializations may performed before the update process continues. These initializations may include the act of copying the entire image, including portions that have been updated, to the RAM buffer again, before resuming the transform 2 phase of the update.

In a representative embodiment of the present invention, a different approach using a more complex technique in updating information in NAND flash may be employed than the one previously described. The primary reason for this is that NAND flash memory is not guaranteed to be reliable. A representative embodiment of the present invention provides is adapted to compensate for the lack of NAND flash memory reliability during the update process. As described above, it is a normal occurrence that some NAND flash memory blocks will be bad when the device is manufactured. In addition, bad blocks may be found at runtime during the life of the device. For all cases, the occurrence of bad NAND flash memory blocks must be managed. In a representative embodiment of the present invention, bad blocks may be completely ignored in this update technique, by employing the Basic NAND Access Mechanism (BNAM) interface described above.

In a representative embodiment of the present invention, NAND flash memory may not be accessed directly, and may be read a page at a time. A page of NAND flash memory may be 512 bytes. For these reasons, and because reading typically takes longer than with NOR flash memory, direct execution of code in a binary image from NAND flash memory is not common. Special logic may be used in some cases to directly execute a code in a binary image from NAND flash memory, although this approach is usually reserved for a small section at the beginning of the NAND flash memory, specifically for booting of the mobile device.

As in the case of NOR flash memory, a compiled binary image may be written to NAND flash memory such as, for example, the NAND flash memories 205, 207 associated with the host systems 209, 211, respectively, of FIG. 2. As in the case of NOR flash memory, the writing of binary image information may not be direct.

Figure 8:
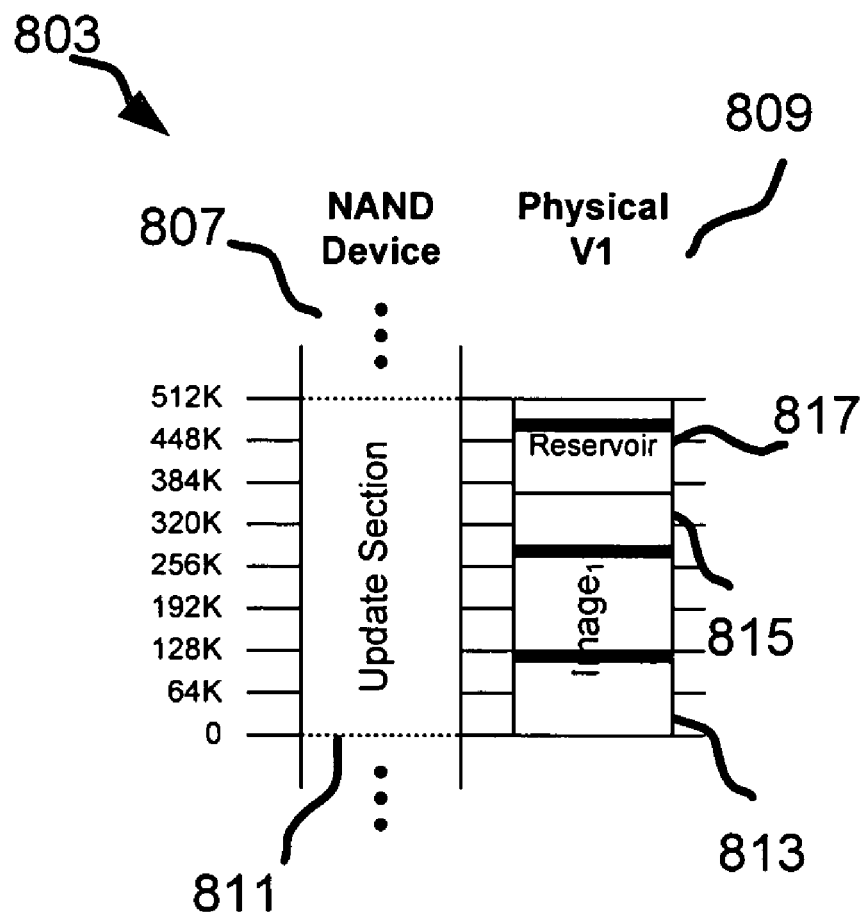
FIG. 8 shows an exemplary memory layout that may exist, for example, in a NAND flash memory where bad memory blocks are present and are represented by 16K black bands, in accordance with a representative embodiment of the present invention.

FIG. 8 shows an exemplary memory layout 803 that may exist, for example, in a NAND flash memory where bad memory blocks are present and are represented by 16K black bands, in accordance with a representative embodiment of the present invention. The memory layout 803 of FIG. 8 shows a NAND flash memory device 807 comprising an update section 811. In addition, the memory layout 803 of FIG. 8 shows a physical memory image 809 comprising binary image Image1 813, and a reservoir 817. In a NAND memory layout with bad blocks, such as the memory layout 803 shown in FIG. 8, an update agent in accordance with a representative embodiment of the present invention may verify whether a memory block being written to or updated is bad. In a manner similar to that for a NOR flash memory, a binary image Image1 813 may be placed at the beginning of a 512K byte update section. When writing data to NAND flash memory, a representative embodiment of the present invention may skip bad NAND flash memory blocks. Therefore, the entire 320K bytes of binary image Image1 813 may still be written completely, although in physical address terms the binary image Image1 813 may be found to occupy addresses from 0 to 352K. In a representative embodiment of the present invention, the interface to NAND flash memory, in this case the BNAM, may automatically handle the detection of bad blocks, skip over them, and proceed to write in the next available valid NAND flash memory block.

In accordance with a representative embodiment of the present invention, when NAND flash memory is used, the first few blocks of the NAND flash memory may be used for a booting mechanism. Therefore, the beginning address of the update section 811 may not align to the physical address of 0x0. Likewise, because execution of the binary image may not be directly from NAND flash memory, the physical addresses may not be the execution addresses. In a representative embodiment of the present invention, the physical addresses of the binary image 813 may be valid only when the binary image 813 in RAM. The address values shown in FIG. 8 may correspond to offsets within the update section 811.

In a representative embodiment of the present invention, generator configuration settings for the NAND flash memory layout of FIG. 8 may be similar to those described for NOR flash memory, with minor changes. The range of addresses in a memory device definition may be set smaller than the actual size of the update section 811. In the example of FIG. 8, the memory space assigned to the update section is shown as 512K bytes. Because the update algorithm may incorporate compensation for the possibility of bad blocks, a size may be selected that is less than the update section size, while still falling on a write unit boundary.

In the example of FIG. 8, the size may be defined as 448K bytes, which is one write unit less than the 512K byte update section. This choice of a size allows for a maximum of four bad memory blocks in the design.

In a representative embodiment of the present invention, the device binary image may be defined to exist from address 0x0 to address 0x70000 (448K). During the update process, however, it may not be located there, because the binary image may be copied to RAM. However, the extents of the device must correspond to the physical location in NAND flash memory of the update section 811.

In a representative embodiment of the present invention, a NAND flash memory may use memory blocks in a different way than NOR flash memory. Most NAND devices are configured to have 16K byte blocks. Erasure may occur on a per memory block basis, while writes may occur on pages, which are normally 512 bytes (plus spare bytes). A representative embodiment of the present invention may use 64K byte write units to be consistent with the NOR flash memory update method, and in the interest of conserving memory. However, write units of larger or smaller size may be employed without departing from the spirit or the scope of the present invention.

In a representative embodiment of the present invention, a 64K byte write unit may be considered to be comprised of four 16K byte NAND flash memory blocks. The illustration of FIG. 8 shows that Image1 813 fits in six write units, whether or not bad flash memory blocks are handled. Write units may be considered as logical entities, not physical entities.

In the a representative embodiment of the present invention, a reserve write unit may not be defined when using this approach. Instead, the remaining space after the binary image Image1 813 to the end of the address range may comprise the reservoir 817. Note that in the illustration of FIG. 8, there is a bad block in the reservoir at address 464K.

In a representative embodiment of the present invention, a RWU may be used, and no empty cache space may be employed. Thus, the control bytes of the RWU (described above) may be utilized (if boot process knows how to skip bad NAND flash memory blocks). An update agent such as, for example, the update agent 113 of FIG. 1 performing update processing may know (e.g., by hard coded data) the intended location of the RWU. The update agent may simply treat the entire reservoir 817 as a pseudo-RWU.

In the current approach being described here, the binary images may be treated substantially the same as that of the NOR flash memory example. As mentioned above, the physical addresses correspond to those in the memory device, which in this case are in a NAND flash memory. During the update process, these physical addresses may be converted or mapped. Because the binary images, during a normal update, may be copied in their entirety to RAM, they may have a different virtual address. This may be properly configured.

In a representative embodiment of the present invention, there may be enough RAM in the associated host system of the mobile device to accommodate the entire update section 811, as well as the normal overhead of an update agent such as, for example, the update agent 113 of FIG. 1. This overhead may include:
1) Update Agent footprint
2) Uncompressed Update Package
3) Write Unit Buffer
4) Roughly 128K of runtime memory
5) Runtime Bad Block Penalty When Writing In a representative embodiment of the present invention, new bad NAND flash memory blocks may be detected while updating firmware in NAND flash memory, when attempting an erase or a write. These bad memory blocks may be in addition to those found at the time of manufacture. The handling of runtime bad flash memory blocks may incur a penalty, since time is taken from normal update processing to "clean" things up.

In a representative embodiment of the present invention, a reservoir may be available to move blocks into. In addition, an update agent such as, for example, the update agent 113 of FIG. 1 may always know where "empty" or unused flash memory blocks are, so that the binary image may be adjusted for runtime bad memory blocks while still abiding by the BNAM method described above. A mechanism in the update agent may be employed to track used and unused memory blocks in an update section, in addition to tracking the bad memory blocks themselves.

The following method may be used to handle runtime bad NAND flash memory blocks:
1) Read the last used memory block to RAM
2) Write that memory block to the first unused memory block after the used memory blocks
3) Continue until the new bad memory block is reached.
4) Add the bad memory block to the bad memory block list
5) Continue the program by erasing and writing to the memory block directly after the detected bad memory block If in the above process another bad memory block is found, a representative embodiment of the present invention may use a recursive scheme to run this method again.

In a representative embodiment of the present invention, a recovery process may be adapted to support fault tolerance if power to the mobile device is lost during the runtime bad block penalty, and to provide a recovery table to recover with if a write unit size is chosen that is other than the block size of the NAND flash memory device in use.

In a representative embodiment of the present invention, the update from a binary image such as, for example, the binary image Image1 667 to a binary image such as, for example, the binary image Image2 671, of FIG. 6B may be a complex process, and may involve an update section scan phase and a transform phase. The transform phase may comprise more than one phase.

In a representative embodiment of the present invention, the update section scan phase may involve locating all bad memory blocks in an update section such as, for example, the update section 811 of FIG. 8. Using any of a variety of mechanisms that may be chosen to convey bad memory blocks, the scan may progress through all blocks of the update section and build a linked list with each node of the list containing the physical address of a bad memory block encountered.

In a representative embodiment of the present invention, a first transform phase, that may be called transform 1 phase may be directed primarily towards backing up data before updating. In order to update memory in a fault tolerant manner, information to be modified may be backed up first, if it contains information used for future modifications. A reservoir such as, for example, the reservoir 817 of FIG. 8 may enable this phase. In a representative embodiment of the present invention, a first write unit may be placed into the reservoir, and then another write unit may be is placed into the previous write unit, and so on. In a representative embodiment of the present invention, preprocessing may also be performed on the data during this phase, before the data is written to the destination write unit. Preprocessing enables a generator such as, for example, the generator 131 of FIG. 1, to achieve smaller update package sizes.

In a representative embodiment of the present invention, the first step in the transform 1 may be to copy a write unit to RAM. Because any write unit may be the write unit being copied, a bad block table may be used to compute the true physical beginning address of the data of the write unit.

In the example shown in FIG. 8, if a write unit at logical address of 192K was to be read, the true physical address, assuming that the update section starts at address 0x0, may be address 208K. The address result from the fact that one bad memory block occurred before this address, so an additional 16K of address space is added to the logical address.

In a representative embodiment of the present invention, the transform 1 may copy write units from the NAND flash memory for processing in RAM. This may be done with a standard memory copy command. In a representative embodiment of the present invention, however, the memory copy utility function may be "overloaded" in an integration such as this in order to make a special interface to the NAND flash memory when copying from the address range of that device. This special interface may support the BNAM method described above.

In a representative embodiment of the present invention, if during the reading of memory a NAND flash memory read error occurs, the update may fail. If any original data has been overwritten, the read failure may be fatal. Because the read failed on reading original data, the memory device may be considered defective.

In a representative embodiment of the present invention, the transform 1 phase may copy the transformed write unit to NAND flash memory. When the transform 1 phase is complete, the write unit may be written to NAND flash memory from RAM. For the first write unit in an update, the destination of such a write may be the end of the reservoir 817. In a representative embodiment of the present invention, the first write unit may be written in reverse order, since it is written to the end of the section. Reverse order, in this case, may mean that the last 16K bytes of the write unit is written first, and so on until the first 16K bytes is written. At any point in this process, if a bad memory block is encountered, either as previously known or detected at runtime, the bad memory block may be marked, and the write may continue from the next memory block, going backwards.

In a representative embodiment of the present invention, the rest of the write units may be written to the location of the previously moved write unit, and may be written in forward order. Note that a runtime bad block penalty may be incurred if a new bad block is detected during the write.

In a representative embodiment of the present invention, writing each write unit to the NAND flash memory may be accomplished by modifying flash memory erase and flash memory write wrapper functions so that they operate on four blocks at a time at the appropriate location for writing.

In a representative embodiment of the present invention, the functionality of an update agent such as, for example, the update agent 113 of FIG. 1 the Update Agent may check the checksum of a written write unit after the write is complete. The checksum function interface may be arranged in the same way as the memory copy functions described above. The data may be copied to a RAM buffer before the checksum is computed.

In a representative embodiment of the present invention, a second transform phase, called the transform 2 phase, may copy an entire valid image from an update section such as, for example, the update section 811 of FIG. 8, to RAM before running the transform 2 phase. This may be done in a function referred to as the update process control function (UPCF), when the transform 1 phase completes. The binary image may be copied to an image buffer, which may be of the size of the entire update section, including a reservoir such as the reservoir 817.

In a representative embodiment of the present invention, the entire update may then be performed on the original binary image in RAM, that has gone through the transform 1 phase update process. Once the update process is complete, the updated binary image may be written to NAND flash memory, using the flash wrapper functions of the UPCF.

In a representative embodiment of the present invention, the first step in the transform 2 may copy the entire binary image to RAM. The binary image may become linear in RAM without any space allocation for bad flash memory blocks.

In a representative embodiment of the present invention, when reading the binary image, a BNAM method in accordance with a representative embodiment of the present invention may be used to read the data and place it in a binary image buffer. This may occur in a wrapper function, and may notify the update agent that the transform 1 phase processing is complete.

In a representative embodiment of the present invention, if during the reading of memory a NAND flash memory read error occurs, the update may fail. If any original data has been overwritten, the read failure may be fatal. Because the read failed on reading original data, the memory device may be considered defective.

In a representative embodiment of the present invention, flash memory may not be referenced during the transform once the binary image is copied to RAM. The transform may reference the original binary image for source material. Because a generator configured to reference this material from addresses in the NAND flash memory address range (i.e., defined by the device definition in the generator), a wrapper function referred to as the ua_device_addressTranslator( ) wrapper function may be implemented to redirect the addresses to the binary image buffer in RAM that is being updated. This redirection may depend on the exact location of the binary image buffer, since it may change when using dynamic memory allocation.

The transform 2 phase of an update process in accordance with a representative embodiment of the present invention may not write to flash memory. Once the transform 2 phase is applied against the entire binary image buffer, then the entire image may be written to the NAND flash memory. Writing may be done on a per write unit basis, so that validity may be checked before moving on to the next write unit. In a representative embodiment of the present invention, a runtime bad block penalty may be incurred if a new bad memory block is detected during the write.

In a representative embodiment of the present invention, each write unit may be written to NAND flash memory in an appropriate update order, so that recovery may be possible in the event of power failure. This may involve the update agent exposing the update order to the UPCF.

In a representative embodiment of the present invention, a final write confirmation may be incorporated at the end of the transform 2 phase. Using the functionality of an update agent such as, for example, the update agent 113 of FIG. 1, a checksum of the written write unit may be checked after the write operation is complete. The checksum interface may be adapted in a fashion similar to that of the memory copy functions described above. The data may be copied to a RAM buffer before the checksum is computed.

In a representative embodiment of the present invention, the recovery scheme for fault tolerance used in a NOR flash memory version of an update process may also be applied to the NAND flash memory case. By using the BNAM reader, described above, and by reading the data of the write unit under examination to RAM before calculating a checksum, the mechanics of the update process may work in the same manner as that for NOR flash memory update.

The update agent in a representative embodiment of the present invention may know at execution which phase of the update process that it is currently in, using state information. If the update process is in the transform 2 phase, the write units may be examined to determine where the transform 1 phase was interrupted. If there are write units left to be updated, initialization may be performed to permit the update process to continue. This initialization may include copying the entire binary image, including portions that have already been updated, to the RAM buffer again, before resuming the transform 2 phase processing.

In a representative embodiment of the present invention, all write units may be written back to NAND flash memory in the order in which they are updated. Therefore, when the entire binary image is again copied to RAM, the write unit that is to be updated next will either be original or invalid.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mobile electronic device having a plurality of processors, each processor having its own address space, the mobile electronic device comprising:
a plurality of NAND memory units communicatively coupled to and associated with the plurality of processors in one-to-one correspondence;
an update agent executable on one of the plurality of processors, the update agent capable of updating code in the NAND memory unit corresponding to the one of the plurality of processors;
an update package resident in the NAND memory unit corresponding to the one of the plurality of processors;
the update agent employing the update package to update the code;
a plurality of random access memory (RAM) units communicatively coupled to and associated with the plurality of processors in one-to-one correspondence; and
the one of the plurality of processors capable of transferring the update agent from the corresponding NAND memory unit into the corresponding RAM memory unit and of executing the update agent in the corresponding RAM memory unit to update the code to the mobile electronic device using less than full page NAND write blocks in order to be consistent with NOR memory unit updates to mobile electronic devices and to accommodate non-direct access to the plurality of NAND memory units and to accommodate bad blocks within the plurality of NAND memory units.

2. The mobile electronic device of claim 1 comprising:
the update agent being resident in the corresponding NAND memory unit associated with the one of the plurality of processors.

3. The mobile electronic device of claim 1 comprising:
a boot loader resident in the NAND memory unit corresponding to the one of the plurality of processors; and
the boot loader copying the update agent to a RAM memory unit corresponding to the one of the plurality of processors and starting execution of the update agent.

4. The mobile electronic device of claim 1 comprising:
an operating system (OS) image resident in the NAND memory unit corresponding to the one of the plurality of processors; and
the update agent employing the update package in updating the operating system (OS) image.

5. The mobile electronic device of claim 4 comprising:
a user data section in the NAND memory unit corresponding to the one of the plurality of processors;
the operating system (OS) image mounting in the NAND memory unit corresponding to the one of the plurality of processors when the operating system (OS) image is run; and
the update agent refraining from updating the user data section while updating the operating system (OS) image.

6. The mobile electronic device of claim 1 comprising:
kernel code resident in the NAND memory unit corresponding to an other of the plurality of processors; and
the one of the plurality of processors instructing the other of the plurality of processors to boot and load the kernel code to a RAM memory unit of the other of the plurality of processors for execution.

7. The mobile electronic device of claim 6 comprising:
a plurality of relocatable modules resident in the NAND memory unit of the other of the plurality of processors; and
the kernel code capable of loading and invoking at least one of the plurality of relocatable modules into the RAM memory unit of the other of the plurality of processors.

8. The mobile electronic device of claim 7 comprising:
a local update agent resident in the NAND memory unit of the other of the plurality of processors; and
the local update agent causing the kernel code to load the at least one of the plurality of relocatable modules into the RAM memory unit of the other of the plurality of processors, update the at least one of the plurality of relocatable modules in a corresponding RAM memory unit, and store the updated relocatable module back in the NAND memory unit of the other of the plurality of processors.

9. A mobile electronic device having a first processor and a second processor each having its own address space, the mobile electronic device comprising:
- a first NAND memory unit associated with and communicatively coupled to the first processor;
- a second NAND memory unit associated with and communicatively coupled to the second processor;
- each of the first processor and the second processor having an associated update agent capable of updating code;
- the first NAND memory unit and the second NAND memory unit each comprising a boot loader, an operating system (OS) image, and a user data section;
- a first update package resident in the first NAND memory unit of the first processor for use by the update agent of the first processor;
- the update agent for the second processor is resident in the first NAND memory unit of the first processor;
- the second processor is associated with and communicatively coupled to a random access memory (RAM) memory unit; and
- the update agent for the second processor is transferred from the first NAND memory unit of the first processor to the RAM memory unit for execution by the second processor to update the code to the mobile electronic device using less than full page NAND write blocks in order to be consistent with NOR memory unit updates to mobile electronic devices and to accommodate non-direct access to the first NAND memory unit and the second NAND memory unit and to accommodate bad blocks within the first NAND memory unit and the second NAND memory unit.

10. The mobile electronic device of claim 9 wherein the first NAND memory unit of the first processor and the second NAND memory unit of the second processor also comprise multiple update sections.

11. The mobile electronic device of claim 10 wherein each of the update sections comprises an image section located prior to a reservoir section.

12. The mobile electronic device of claim 10 wherein a logical size of each of the update sections is less than a physical size of each of the update sections.

13. The mobile electronic device of claim 10 wherein the update agents associated with the first processor and the second processor track used and unused blocks in the update sections of the corresponding first and second NAND memory units, in addition to bad blocks in the update sections.

14. The mobile electronic device of claim 10 wherein the update agents associated with the first processor and the second processor employ a scan phase to locate bad blocks in the associated update sections, a first transform phase to back up at least a portion of the contents of the associated update sections before updating the at least a portion of the contents of the associated update sections, a transfer phase to copy the at least a portion of the contents of the associated update sections to an associated RAM memory unit, and a second transform phase to update the copied at least a portion of the contents of the associated update sections in the associated RAM memory unit.

15. The mobile electronic device of claim 9 comprising:
- a second update package resident in the first NAND memory unit of the first processor for use by the update agent of the second processor; and
- the mobile electronic device communicating the second update package from the first NAND memory unit of the first processor to the second NAND memory unit of the second processor for use by the update agent of the second processor.

16. The mobile electronic device of claim 15 comprising:
- an operating system (OS) image resident in the first NAND memory unit of the first processor; and
- the update agent associated with the first processor employing the first update package to update the operating system (OS) image.

17. The mobile electronic device of claim 15 wherein the first update package is stored in a reserved space in the first NAND memory unit of the first processor.

18. The mobile electronic device of claim 17 wherein the first update package is stored in the reserved space using a basic NAND access mechanism (BNAM) method.

19. The mobile electronic device of claim 15 wherein the first update package is stored in the user data section in the first NAND memory unit of the first processor.

20. The mobile electronic device of claim 15 wherein the update agents associated with the first processor and the second processor track unused blocks in the corresponding first and second NAND memory units so that a binary image can be adjusted at run time for bad blocks during an update process.

21. The mobile electronic device of claim 9 wherein the update agent associated with the first processor tracks unused blocks in the corresponding first NAND memory unit so that the operating system (OS) image can be updated at run time despite the discovery of bad blocks during the update.

22. The mobile electronic device of claim 9 comprising:
- an update risk evaluator that evaluates the possibility of a successful update by at least one of the first update agent and the second update agent based upon the total number of known bad blocks in the corresponding first and second NAND memory units being updated.

* * * * *